United States Patent
Tiwari et al.

(10) Patent No.: US 11,106,324 B2
(45) Date of Patent: Aug. 31, 2021

(54) DYNAMIC RENDERING OF ITEMS IN SPACE-CONSTRAINED CONTAINER IN USER INTERFACE

(71) Applicant: Microsoft Technology Licensing, LLC, Redmond, WA (US)

(72) Inventors: Om Shankar Tiwari, Santa Clara, CA (US); Cheryl Smith, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 16/231,250

(22) Filed: Dec. 21, 2018

(65) Prior Publication Data

US 2020/0201920 A1    Jun. 25, 2020

(51) Int. Cl.
*G06F 3/0481* (2013.01)
*G06F 16/957* (2019.01)
*G06F 16/958* (2019.01)

(52) U.S. Cl.
CPC ........ *G06F 3/0481* (2013.01); *G06F 3/04812* (2013.01); *G06F 16/9574* (2019.01); *G06F 16/9577* (2019.01); *G06F 16/958* (2019.01); *G06F 2203/04803* (2013.01)

(58) Field of Classification Search
CPC ............................ G06F 16/958; G06F 16/9577
See application file for complete search history.

(56) References Cited

U.S. PATENT DOCUMENTS

| | | | | |
|---|---|---|---|---|
| 10,664,772 | B1* | 5/2020 | Poel ................. | G06Q 10/06311 |
| 2014/0380229 | A1* | 12/2014 | Volodin ............... | G06F 3/0482 |
| | | | | 715/780 |
| 2015/0242110 | A1* | 8/2015 | Balakrishnan .... | G06F 16/24578 |
| | | | | 715/830 |

(Continued)

OTHER PUBLICATIONS

"Class selectors", Retrieved from: https://web.archive.org/web/20180426055505/https://developer.mozilla.org/en-US/docs/Web/CSS/Class_selectors, Published Date: Apr. 26, 2018, 8 Pages.

(Continued)

*Primary Examiner* — Scott T Baderman
*Assistant Examiner* — Seung Woon Jung
(74) *Attorney, Agent, or Firm* — Hickman Becker Bingham Ledesma LLP

(57) ABSTRACT

A machine for dynamic content rendering in a space-constrained online container. The machine accesses a plurality of items of digital content. The machine dynamically renders the plurality of items in a dedicated area of a user interface. The dynamic rendering includes: dynamically determining, for display in the dedicated area, a first item group of one or more items of the plurality of items; causing display of the first item group in the dedicated area; and dynamically determining a second item group of one or more items of the plurality of items. The items included in the second item group are associated with a hidden style based on dynamically determining that the dynamic rendering of the items included in the second item group overflows the dedicated area. The machine dynamically renders a call-to-action button in the dedicated area. The call-to-action button indicates the number of items in the second item group.

18 Claims, 10 Drawing Sheets

(56) References Cited

U.S. PATENT DOCUMENTS

2015/0304437 A1* 10/2015 Vaccari ............ G06F 17/30268
709/204

OTHER PUBLICATIONS

"Position", Retrieved from: https://web.archive.org/web/20191210101243/https://developer.mozilla.org/en-US/docs/Web/CSS/position, Published Date: Dec. 25, 2019, 17 Pages.
"Using shadow DOM", Retrieved from: https://web.archive.org/web/20190808183629/https://developer.mozilla.org/en-US/docs/Web/Web_Components/Using_shadow_DOM, Published Date: Aug. 8, 2019, 9 Pages.
Bidelman, Eric, "Shadow DOM v1: Self-Contained Web Components", Retrieved from: https://web.archive.org/web/20190910154440/https://developers.google.com/web/fundamentals/web-components/shadowdom, Retrieved from: Sep. 10, 2019, 34 Pages.

* cited by examiner

US 11,106,324 B2

DYNAMIC RENDERING OF ITEMS IN SPACE-CONSTRAINED CONTAINER IN USER INTERFACE

TECHNICAL FIELD

The present application relates generally to systems, methods, and computer program products for dynamic rendering of items of content in a space-constrained online container included in a user interface.

BACKGROUND

Generally, when there are more digital content items than fit in a limited-space online container presented in a user interface, some of the digital content items will overflow the limited space. In some instances, only a visual indication is provided to the user via the user interface to inform the user that there is overflowing content that is not being shown at the time. For example, where there are only text items that overflow, a Cascading Style Sheets (also "CSS") ellipsis style can be used to tell the user that there is more content.

In certain instances, the user is provided a mechanism for viewing overflowing content. However, this may cause the other existing content to shift (e.g., be pushed lower) in the user interface. The shifting of other content in the user interface may be undesirable in a compact space.

In some instances, the shown content is limited to a certain number N of items. After rendering exactly N items, a call-to-action user interface element (e.g., a "more" button or a plus sign button) is provided that opens a pop-up window in which the complete content is rendered a second time. The shortcomings with this approach are multi-fold. First, the rendering of the N items twice is wasteful of computer resources. Second, the width and height of the items must either be the same, or be known beforehand, to correctly determine the number of items that will overflow the limited-space online container. Also, the width of the call-to-action user interface element has to be taken into account. Third, if any of these width values change (e.g., as a result of translation of the content items, the content items can become longer or shorter), then the identifying of the overflowing items may not be accurate. Fourth, the number of items shown in the first render is hard-coded. For example, if there are ten items, it may be hard-coded in the system that only two items of the ten items be displayed. A button that says "8 more items" may be also shown to indicate that additional content is available. The use of hard-coding the number of displayed items may result in under-used space (e.g., an additional item could be displayed in the remaining space), or over-used space (e.g., one of the items included in the hard-coded number is so large that it does not fit in the available space of the container).

The common approaches to rendering overflowing content in a space-constrained online container included in a user interface tend to be computationally rigid and inefficient, thereby resulting in a technical problem of excessive consumption of the electronic resources of a computer system performing the rendering of digital content.

BRIEF DESCRIPTION OF THE DRAWINGS

Some embodiments are illustrated by way of example and not limitation in the figures of the accompanying drawings, in which.

DETAILED DESCRIPTION

I. Overview

Figure 1:
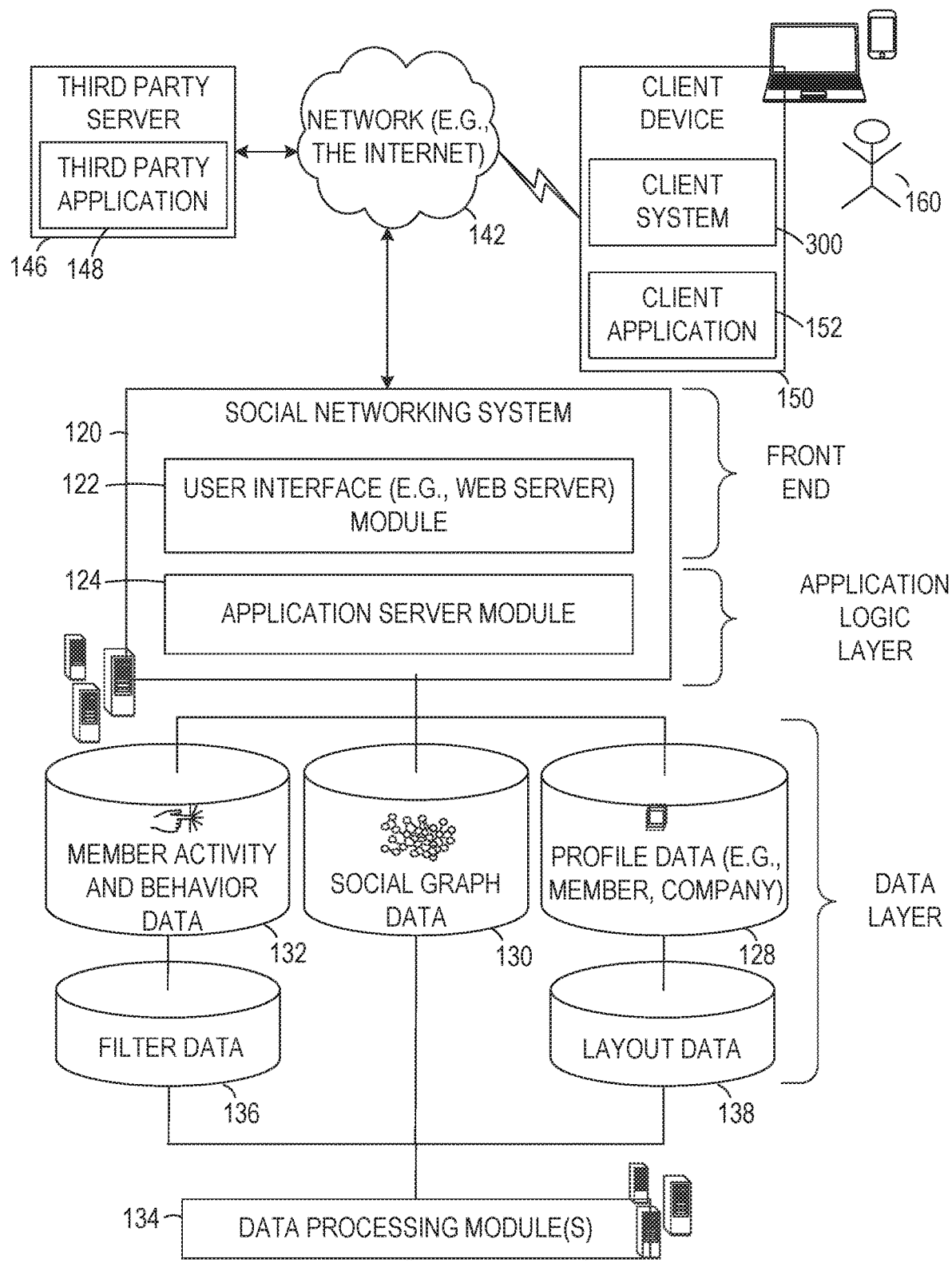
FIG. 1 is a network diagram illustrating a client-server system, according to some example embodiments.

Given a dedicated area (e.g., an online container) with limited horizontal and vertical space in a user interface displayed in a browser, and given more digital content to display than fits the available space in the dedicated area, a client system that facilitates the viewing of the digital content in-place in the dedicated area without causing distortions in the user interface or shifting existing additional content in the user interface, while also indicating the correct amount of overflowing content, also provides a technical solution to the technical problem of excessive consumption of the electronic resources of a computer system performing the rendering of digital content.

In some example embodiments, a client system accesses a plurality of items of digital content. The client system dynamically renders the plurality of items in a dedicated area of a user interface of a client device. The dynamic rendering includes dynamically determining, for display in the dedicated area of the user interface, a first item group of one or more items of the plurality of items. The dynamic determining of the first item group is based on dimensions of the one or more items in the first item group and dimensions of the dedicated area of the user interface. The dynamic rendering further includes causing display of the first item group of the plurality of items in the dedicated area of the user interface. The dynamic rendering further includes dynamically determining a second item group of one or more items of the plurality of items. The one or more items included in the second item group is associated with a hidden style based on dynamically determining that the dynamic rendering of the one or more items included in the second item group overflows the dedicated area. The client system dynamically renders a call-to-action button in the dedicated area of the user interface based on the dynamic determining that the dynamic rendering of the one or more items included in the second item group overflows the dedicated area. The call-to-action button indicates a number of items included in the second item group.

Such a client system improves upon existing systems that employ repetition of a Document Object Model (DOM), that render only a predetermined hard-coded number of items in the dedicated area, or that cause content external to the dedicated area to shift based on a request to display additional content in the dedicated area. The client system improves on the existing systems by dynamically filling the dedicated area with a maximum number of items possible by rendering both the visible items and the overflowing items (that will be hidden initially) right in the first step for a consistent user interface experience. As a result, the client device does not perform unnecessary operations, such as additional network calls for fetching of data.

Additionally, the client system improves on the existing systems by performing a correct calculation of the number of overflowing items for association with a call-to-action user interface element (e.g., a button that indicates "5 more items") while dynamically maximizing the use of space included in the dedicated area of the user interface. This allows for consistently accurate information being displayed in association with the call-to-action user interface element. Moreover, such a call-to-action user interface element is only displayed based on a dynamic determination that there is overflowing content that was rendered but not displayed in the dedicated area of the user interface, thus improving the efficient use of space in the dedicated area of the user interface.

Yet another technical improvement provided by the client system s the increase in the efficiency of use of computer resources by employing a non-repetitive DOM to show the hidden items together with the previously visible items without repeating the items that were already rendered and displayed previously. Furthermore, the determination or calculations performed by the client system are dynamic, content-type agnostic, and content-language agnostic.

II. Detailed Example Embodiments

Example methods and systems for dynamic rendering of items of content in a space-constrained online container included in a user interface are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

An example method and system for dynamic rendering of items of content in a space-constrained online container included in a user interface may be implemented in the context of the client-server system illustrated in FIG. 1. As illustrated in FIG. 1, the client system 300 is part of the client device 150. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 142 to exchange information with the social networking system 120. Each of the client devices 150 may comprise a computing device that includes at least a display and communication capabilities with the network 142 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online content consumption event associated with the member (e.g., an online content item viewed by the member), the date and time when the online content consumption event took place, an identifier of the creative associated with the online content consumption event, a source identifier of the creative associated with the online content item, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, client device 150 may include the client system 300, which is described in more detail below.

Further, as shown in FIG. 1, a data processing module 134 may be used with a variety of applications, services, and features of the social networking system 120. The data processing module 134 may periodically access one or more of the databases 128, 130, 132, 136, or 138, process (e.g., execute batch process jobs to analyze or mine) profile data, social graph data, member activity and behavior data, filter data, or layout data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party servers) 146, is shown as being communicatively coupled to the social networking system 120 and the client device(s) 150. The third party server(s) 146 may support one or more features or functions on a website hosted by the third party.

Figure 2:
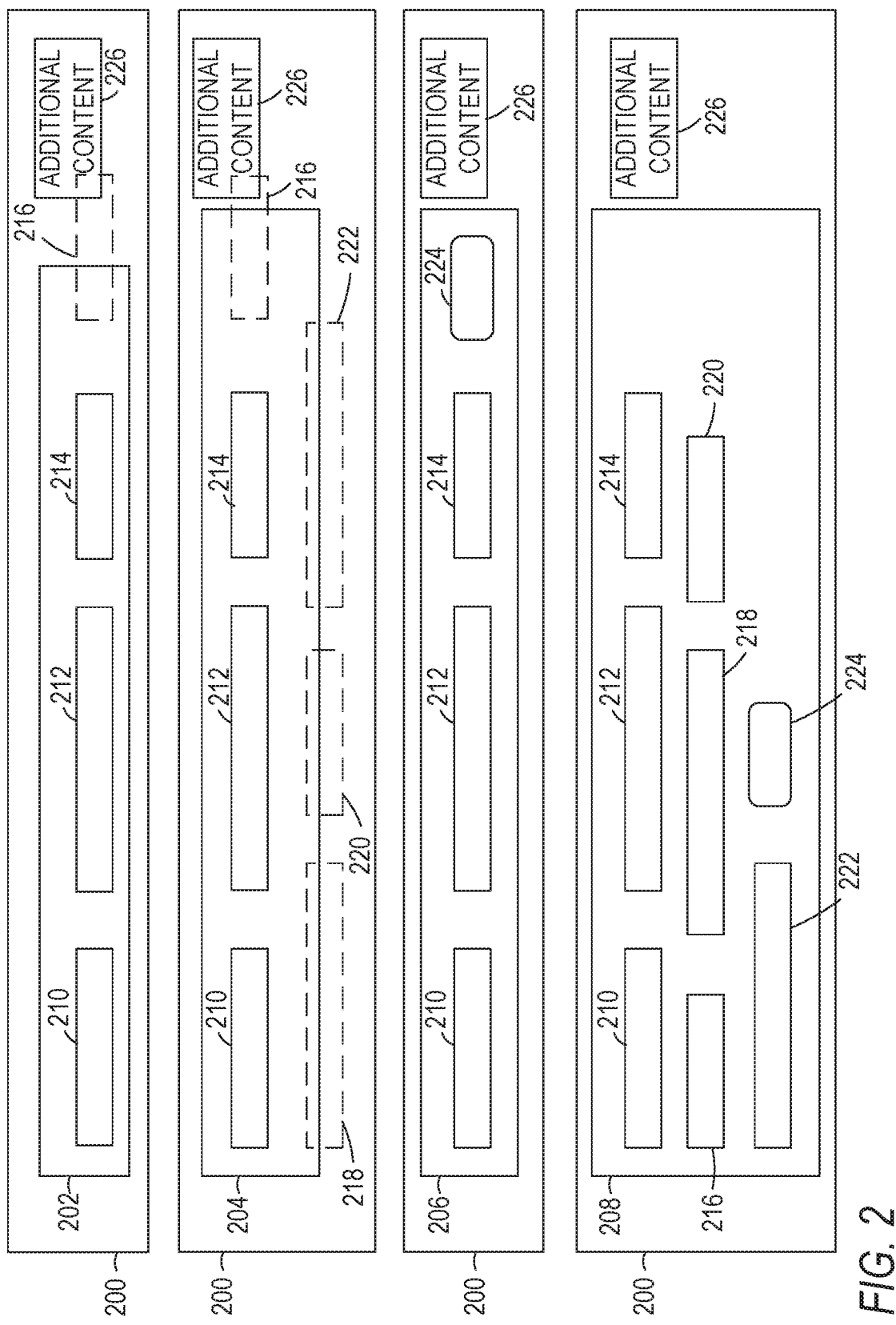
FIG. 2 illustrates examples of a dedicated area in a user interface, wherein the dedicated area is used for dynamic rendering of items of content in a space-constrained online container included in a user interface, according to some example embodiments.

FIG. 2 illustrates examples of a dedicated area in a user interface, wherein the dedicated area is used for dynamic rendering of items of content in a user interface, according to some example embodiments. The dedicated area may be a space-constrained online container included in user interface 200. Dedicated area instances 202, 204, 206, and 208 are examples of the dedicated area presented in the user interface 200 at various steps of operation. Additional or other content item(s) 226 may be displayed adjacent to the dedicated area. Although, in FIG. 2, the additional content item 226 is displayed to the right of the dedicated area, the additional content item 226 may be displayed anywhere else in the user interface 200, adjacent to (e.g., below) the dedicated area.

At step one, the client system 300 dynamically fills the dedicated area 202 with as much content as can be rendered in the dedicated area 202. For example, Shadow DOM or Regular DOM is used to render an overlay with specified dimensions is rendered, and to progressively render each content item 210, 212, 214, and 216 in the dedicated area 202. Based on the number of items to be rendered in the dedicated area 202, the dedicated area 202 may or may not be overflown. In some example embodiments, the client system 300 performs CSS positioning calculation in JavaScript while rendering in Shadow DOM or Regular DOM.

The content items identified as overflowing are associated with a hidden style in the DOM, and are not displayed even though they are rendered. For example, the client system 300 determines that content item 216 overflows the dedicated area 202. The content item 216 is associated with a hidden style in the DOM, and is automatically clipped (e.g., hidden temporarily).

At step two, as illustrated using the dedicated area 204 and dedicated area 206, the client system 300 determines (e.g., calculates) the number of items that overflow the dedicated area 204 (e.g., items 216, 218, 220, and 222) while rendering the overflowing items, and renders a call-to-action button 224 that indicates the number of items that overflow the dedicated area 204.

At step three, based on receiving a selection, by a user of the client system 300, of the call-to-action button 224, the same DOM is shown as an overlapping area that displays the previously shown items 210, 212, and 214, as well as the previously hidden, overflowing items 216, 218, 220, and 222. The overlapping area is an expanded dedicated area 208 that overlaps the additional content 216 such that the user interface 200 is not distorted, and the additional content 216 is not shifted out of its place in the user interface. In some instances, the overlapping area may have a level of transparency that allows the user to see that there is some additional content that is being overlapped. Accordingly, the content items are dynamically rendered once, some content items are dynamically displayed if it is dynamically determined that they can be fully displayed in the dedicated area, and other content items are dynamically displayed based on the selection of the call-to-action button 224.

In some example embodiments, if the content to be displayed in the dedicated area is modifiable (e.g., a user can add or remove items), the client system 300 dynamically determines (e.g., re-calculates) what items can be displayed, what items are hidden, and the number associated with the call-to-action button 224 using event listener APIs that remember previous calculations and perform only part(s) of the calculation to update the correct number.

In various example embodiments, using Shadow DOM or Regular DOM, an overlay with specified dimensions is rendered but clipped to the size of the dedicated area in the user interface 200. The individual content items are then rendered one-by-one while determining, based on calculations using dimensions of the items and of the dedicated area, if the rendered items will overflow on each render. An "overflow: hidden style" is associated with one or more items that overflow the dedicated area. As a result, the overflowing content is automatically clipped (e.g., not shown).

When the first item is discovered that will overflow the dedicated area, it is moved to a stack (e.g., array). Any remaining overflowing items are moved to the stack. As long as the stack has any items, the client system 300 renders and causes to display a call-to-action button in the user interface. The call-to-action button indicates a value that corresponds to the number of overflowing (e.g., hidden) items included in the stack. Accordingly, the value associated with the call-to-action button is the size of the stack. The call-to-action button is associated with an event, such that a selection of the call-to-action button adds a class to the parent overlay (e.g., the unexpanded version of the dedicated area).

The items in this stack are added to a class A that hides them when there is no overlay action requested (e.g., by a selection of the call-to-action button) So they are rendered but not visible (e.g., have zero width and height) initially. When the call-to-action is selected (e.g., clicked), a class 13 is added to the parent overlay, which causes the dedicated area to float on top of the existing layout as an overlay, such that the layout is not shifted and broken, and the other content outside the dedicated area remains in-place in the user interface.

The items in the stack are styled in such a way that all class A items are visible in a parent with class B. That is, if the parent overlay does not have the class B (e.g., is not open), the overflowing items are hidden. If the parent overlay has the class B, the overflowing items become visible.

Figure 3:
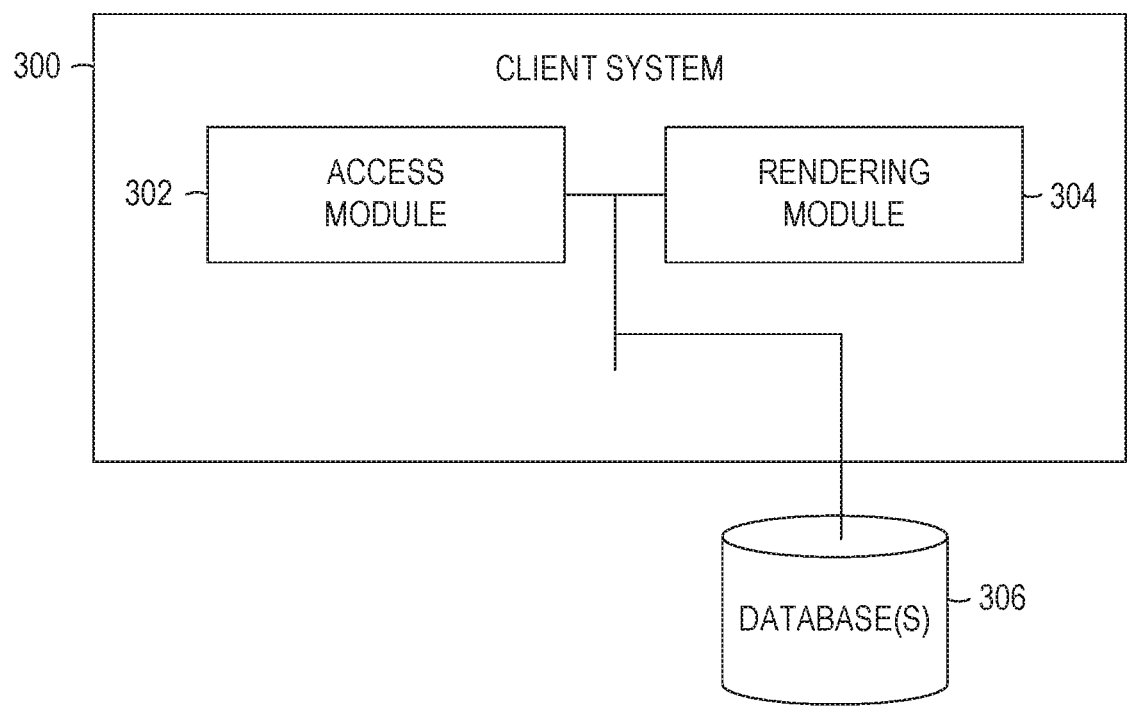
FIG. 3 is a block diagram illustrating components of a client system, according to some example embodiments.

FIG. 3 is a block diagram illustrating components of the client system 300, according to some example embodiments. As shown in FIG. 3, the client system 300 includes an access module 302 and a rendering module 304, both configured to communicate with each other (e.g., via a bus, shared memory, or a switch).

According to some example embodiments, the access module 302 accesses a plurality of items of digital content. In some example embodiments, the plurality of items includes a plurality of identifiers of filters of content. The plurality of items of digital content may be accessed from a database record, or may be received from the client system 300.

The rendering module 304 dynamically renders the plurality of items in a dedicated area of a user interface of a client device. The dedicated area of the user interface is an area of fixed dimensions.

The dynamic rendering includes dynamically determining, for display in the dedicated area of the user interface, a first item group of one or more items of the plurality of items. The dynamic determining of the first item group of one or more items is based on dimensions of the one or more items in the first item group and dimensions of the dedicated area of the user interface. The dynamic rendering further includes causing display of the first item group of the plurality of items in the dedicated area of the user interface.

The dynamic rendering further includes dynamically determining a second item group of one or more items of the plurality of items. Based on dynamically determining that the dynamic rendering of the one or more items included in the second item group overflows the dedicated area, the one or more items included in the second item group are associated with a hidden style. For example, using Shadow DOM or Regular DOM, an overlay with specified dimensions is rendered in the user interface of a browser but clipped to certain dimensions associated with the dedicated area. Based on a determination that one or more items overflow the dedicated area, a hidden style is associated with the overflowing items, and the overflowing items are automatically clipped.

The rendering module 304 dynamically renders a call-to-action button in the dedicated area of the user interface based on the dynamic determining that the dynamic rendering of the one or more items included in the second item group overflows the dedicated area. The call-to-action button indicates a number of items included in the second item group. For example, the call-to-action button is a user interface element that displays a message, such as "5 more items," or "+5 items." A selection of the call-to-action button may generate a request to cause display of the items included in the second item group (e.g., the remaining items in the plurality of items after the one or more items included in the first item group are caused to display in the dedicated area of the user interface).

In some example embodiments, the one or more items included in the second group are assigned to a stack. The call-to-action button is dynamically rendered in the dedicated area based on a determination that the stack includes at least one item. The call-to-action button indicates a size of the stack.

To perform one or more of its functionalities, the client system 300 may communicate with one or more other systems. For example, an integration system may integrate the client system 300 with one or more email servers, web servers, one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 306 (e.g., database 128, 130, 132, 136, or 138).

Figure 4:
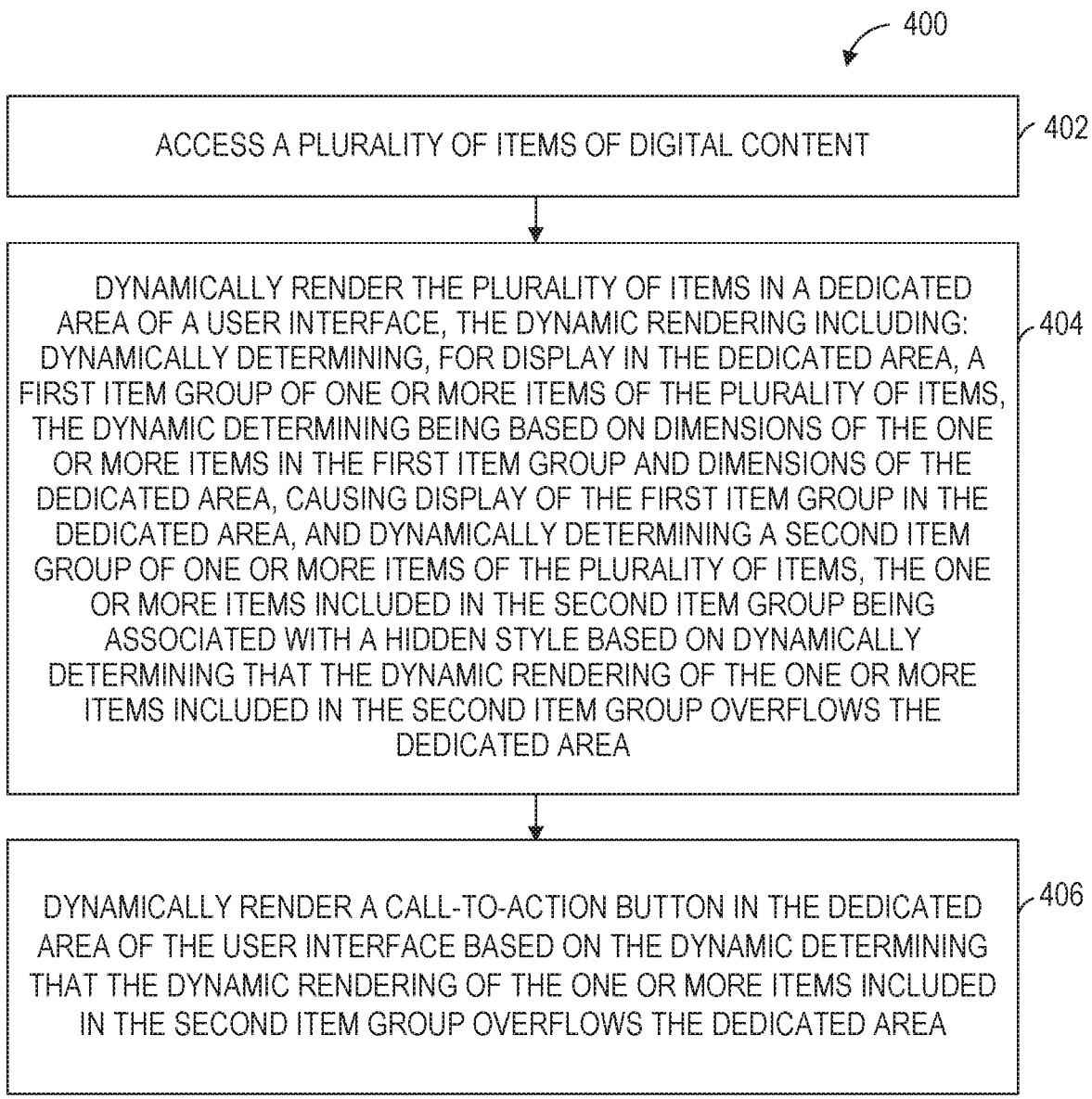
FIG. 4 is a flowchart illustrating a method for dynamic rendering of items of content in a space-constrained online container included in a user interface, according to some example embodiments.

FIGS. 4-7 are flowcharts illustrating a method for dynamic rendering of items of content in a space-constrained online container included in a user interface, according to some example embodiments. Operations in the method 400 illustrated in FIG. 4 may be performed using modules described above with respect to FIG. 3. As shown in FIG. 4, method 400 may include one or more of method operations 402, 404, and 406, according to some example embodiments.

At operation 402, the access module 302 accesses a plurality of items of digital content. In some example embodiments, the plurality of items includes a plurality of identifiers of filters of content. The plurality of items of digital content may be accessed from a database record, or may be received from the client system 300. For example, a user of the client device may select a plurality of filters from a number of filters, and an input module of the client device may transmit identifiers of the selected filters to the access module 302.

At operation 404, the rendering module 304 dynamically renders the plurality of items in a dedicated area of a user interface of a client device. The dedicated area of the user interface is an area of fixed dimensions. The user interface may display additional content items adjacent to (e.g., before, after, to the left of, or to the right of) the dedicated area of the user interface.

The dynamic rendering includes dynamically determining, for display in the dedicated area of the user interface, a first item group of one or more items of the plurality of items. The dynamic determining of the first item group of one or more items is based on dimensions of the one or more items in the first item group and dimensions of the dedicated area of the user interface. The dynamic rendering further includes causing display of the first item group of the plurality of items in the dedicated area of the user interface.

The dynamic rendering further includes dynamically determining a second item group of one or more items of the plurality of items. Based on dynamically determining that the dynamic rendering of the one or more items included in the second item group overflows the dedicated area, the one or more items included in the second item group are associated with a hidden style. For example, using Shadow DOM or Regular DOM, an overlay with specified dimensions is rendered in the user interface of a browser but clipped to certain dimensions associated with the dedicated area. Based on a determination that one or more items overflow the dedicated area, a hidden style is associated with the overflowing items, and the overflowing items are automatically clipped.

At operation 406, the rendering module 304 dynamically renders a call-to-action button in the dedicated area of the user interface based on the dynamic determining that the dynamic rendering of the one or more items included in the second item group overflows the dedicated area. The call-to-action button indicates a number of items included in the second item group. For example, the call-to-action button is a user interface element that displays a message, such as "5 more items," or "+5 items." A selection of the call-to-action button via the user interface, by a user of the client device, may generate a request to cause display of the items included in the second item group (e.g., the remaining items in the plurality of items after the one or more items included in the first item group are caused to display in the dedicated area of the user interface).

Further details with respect to the method operations of the method 400 are described below with respect to FIGS. 5-7.

Figure 5:
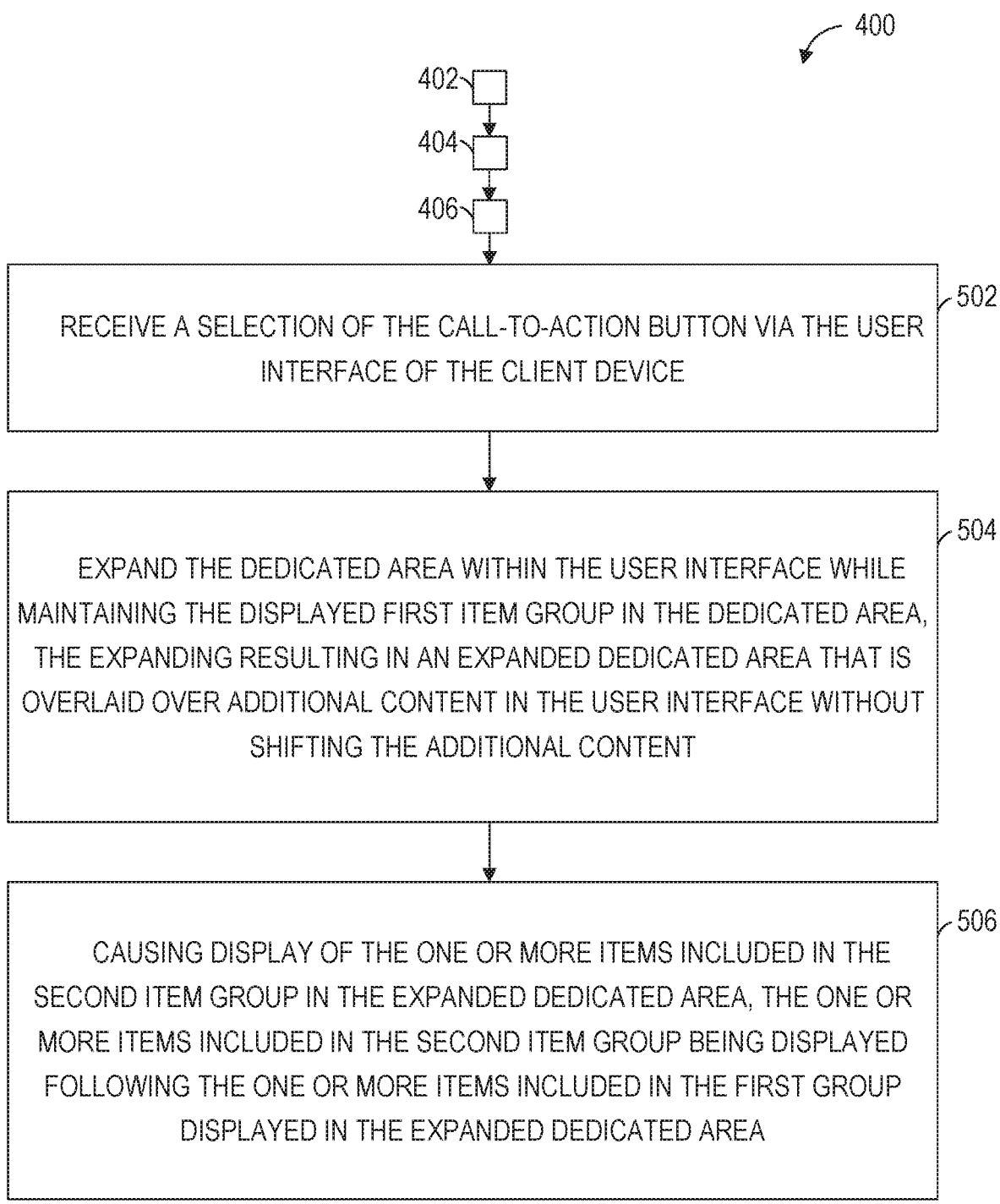
FIG. 5 is a flowchart illustrating a method for dynamic rendering of items of content in a space-constrained online container included in a user interface, and representing additional steps of FIG. 4, according to some example embodiments.

As shown in FIG. 5, the method 400 includes one or more of operations 502, 504, or 506, according to some example embodiments. Operation 502 may be performed after operation 406 of FIG. 4, in which the rendering module 304 dynamically renders a call-to-action button in the dedicated area of the user interface based on the dynamic determining that the dynamic rendering of the one or more items included in the second item group overflows the dedicated area.

At operation 502, the access module 302 receives a selection of the call-to-action button via the user interface of the client device. The selection of the call-to-action button may be made by a user of the client device.

At operation 504, the rendering module 304 expands the dedicated area within the user interface while maintaining the displayed first item group in the dedicated area. The expanding of the dedicated area results in an expanded dedicated area that is overlaid over additional content in the user interface without shifting the additional content. Additional content items may be displayed in one or more additional areas adjacent to the dedicated area in the user interface.

At operation 504, the rendering module 304 causes display of the one or more items included in the second item group in the expanded dedicated area. The one or more items included in the second item group are displayed following the one or more items included in the first group displayed in the expanded dedicated area.

In some example embodiments, the expanded dedicated area is an overlay of specified dimensions. The overlay is rendered but clipped until a selection of the call-to-action button is received. The one or more items in the second item group are associated with a hidden style. The one or more items in the second item group are caused to display (e.g., are made to be visible) based on receiving the selection of the call-to-action button.

Figure 6:
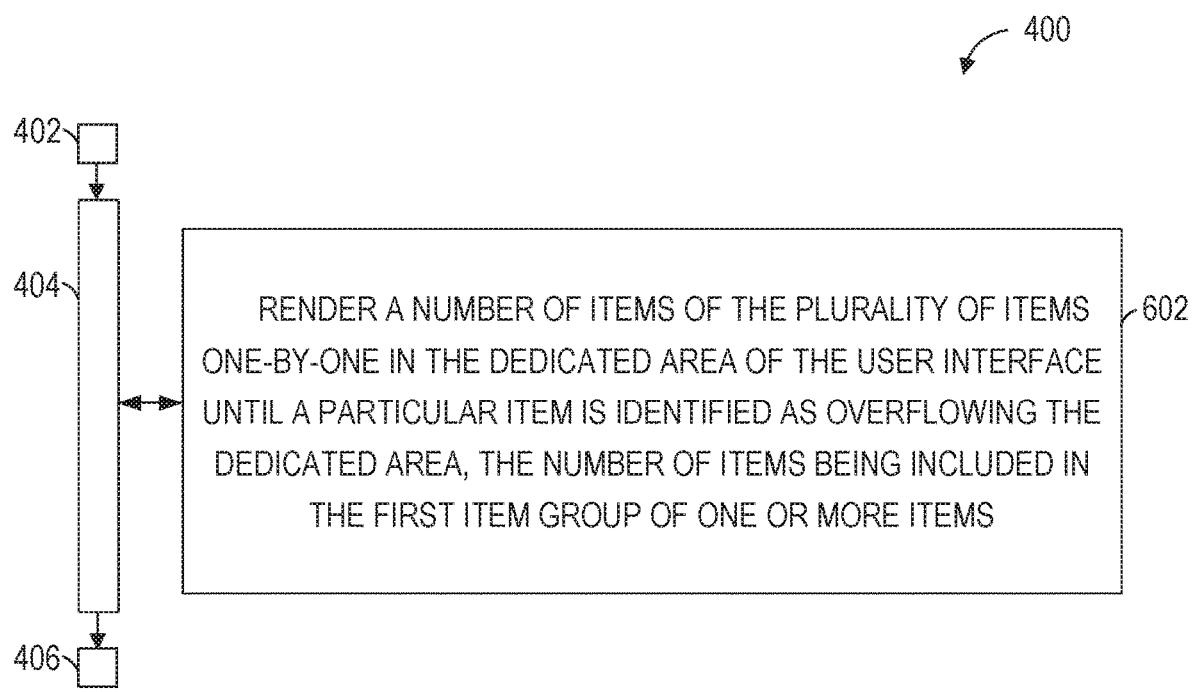
FIG. 6 is a flowchart illustrating a method for dynamic rendering of items of content in a space-constrained online container included in a user interface, and representing step 404 of FIG. 4 in more detail, according to some example embodiments.

As shown in FIG. 6, the method 400 includes operation 602, according to some example embodiments. Operation 602 may be performed as part (e.g., a precursor task, a subroutine, or a portion) of operation 404 of FIG. 4, in which the rendering module 304 dynamically renders the plurality of items in a dedicated area of a user interface of a client device. At operation 602, the dynamic determining of the first item group includes rendering, by the rendering module 304, a number of items of the plurality of items one-by-one in the dedicated area of the user interface until a particular item is identified as overflowing the dedicated area. The number of items is included in the first item group of one or more items.

Figure 7:
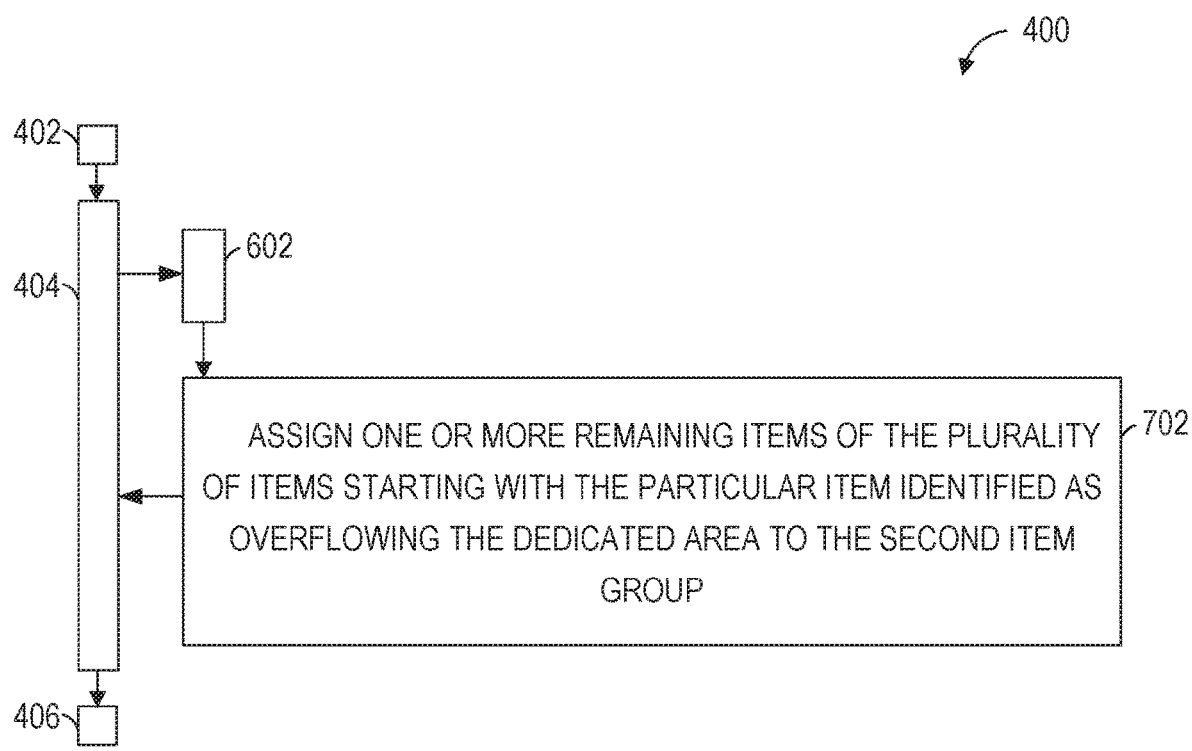
FIG. 7 is a flowchart illustrating a method for dynamic rendering of items of content in a space-constrained online container included in a user interface, and representing step 404 of FIG. 6 in more detail, according to some example embodiments.

As shown in FIG. 7, the method 400 includes operations 702, according to some example embodiments. Operation 702 may be performed after operation 602 of FIG. 6, in which the dynamic determining of the first item group includes rendering, by the rendering module 304, a number of items of the plurality of items one-by-one in the dedicated area of the user interface until a particular item is identified as overflowing the dedicated area.

At operation 702, the dynamic determining of the second item group includes assigning, by the rendering module 304, one or more remaining items of the plurality of items starting with the particular item identified as overflowing the dedicated area to the second item group.

In some example embodiments, the one or more items included in the second group are assigned to a stack, the call-to-action button is dynamically rendered in the dedicated area based on a determination that the stack includes at least one item, and the call-to-action button indicates a size of the stack.

Figure 8:
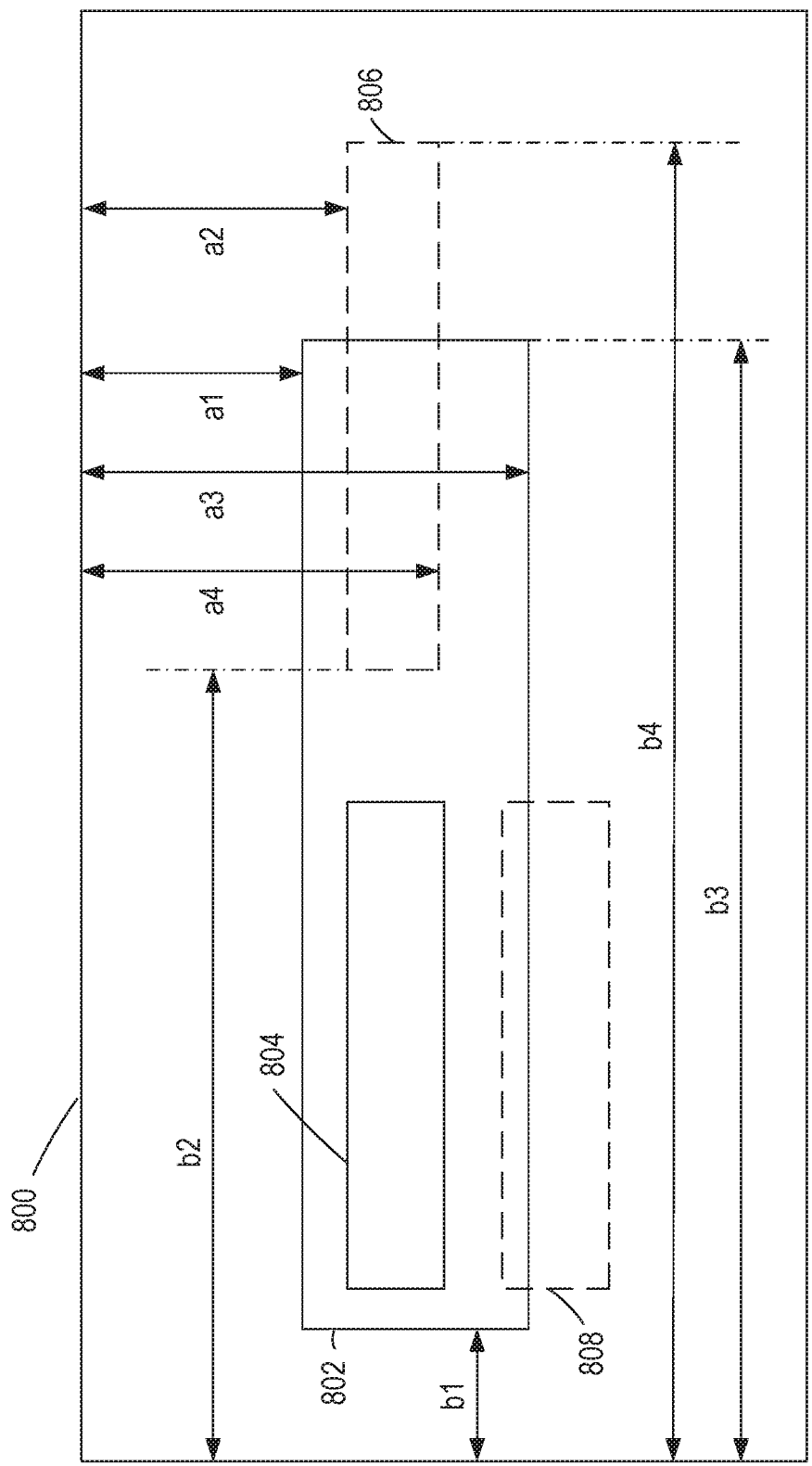
FIG. 8 is a block diagram that illustrates a determination of an occurrence of overflow of the dedicated area in the user interface of a client device, according to some example embodiments.

As shown in FIG. 8, is a block diagram that illustrates a determination of an occurrence of overflow of the dedicated area in the user interface of a client device, according to some example embodiments. As shown in FIG. 8, content items 804, 806, and 808 are rendered in the dedicated area 802 of the user interface 800.

In some example embodiments, the client system 300 performs a CSS positioning calculation in JavaScript while rendering content items in Shadow DOM or Regular DOM. For any item to be "not overflowing," as shown in FIG. 8 using the example of item 806, (1) the distance between the top edge of the user interface 800 and the top-most vertical point (or edge, or side) of the item 806 should be greater or equal to the distance between the top edge of the user interface 800 and the top-most vertical point (or edge, or side) of the online container 802 (e.g., $a_2 \geq a_1$, as shown in FIG. 8), (2) the distance between the top edge of the user interface 800 and the bottom-most vertical point (or edge, or side) of the item 806 should be less or equal to the bottom-most vertical point (or edge, or side) of the online container 802 (e.g., $a_4 \leq a_3$, as shown in FIG. 8), (3) the distance between the left edge of the user interface 800 and the left-most horizontal point (or edge, or side) of the item 806 should be more or equal to the distance between the left edge of the user interface 800 and the left-most horizontal point (or edge, or side) of the online container 802 (e.g., $b_2 \geq b_1$, as shown in FIG. 8), and (4) the distance between the left edge of the user interface 800 and the right-most horizontal point (or edge, or side) of the item 806 should be less or equal to the distance between the left edge of the user interface 800 and the right-most horizontal point (or edge, or side) of the online container 802 (e.g., $b_4$ should be less than $b_3$).

If, however, any of the above inequalities are not true (e.g., $b_4 \geq b_3$, as shown in FIG. 8), then the client system 300 determines that the item (e.g., item 806) is "overflowing" the dedicated area (e.g., online container 802).

Example Mobile Device

Figure 9:
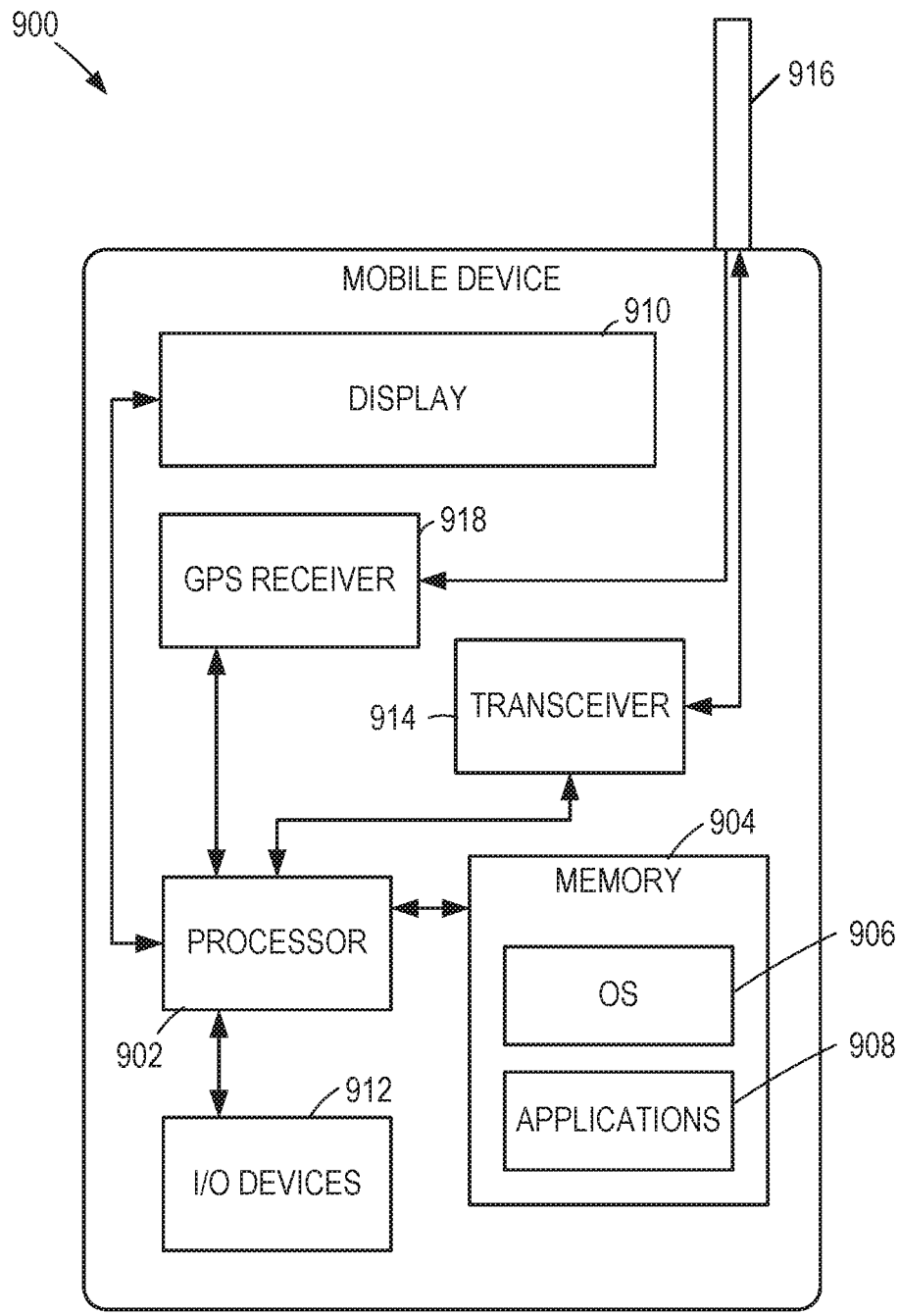
FIG. 9 illustrates an example mobile device, according to various embodiments.

FIG. 9 is a block diagram illustrating the mobile device 900, according to an example embodiment. The mobile device may correspond to, for example, one or more client machines or application servers. One or more of the modules of the system 200 illustrated in FIG. 2 may be implemented on or executed by the mobile device 900. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide LBSs to a user. The processor 902 may be coupled, either directly or via appropriate intermediary hardware, to a display 910 and to one or more input/output (110) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
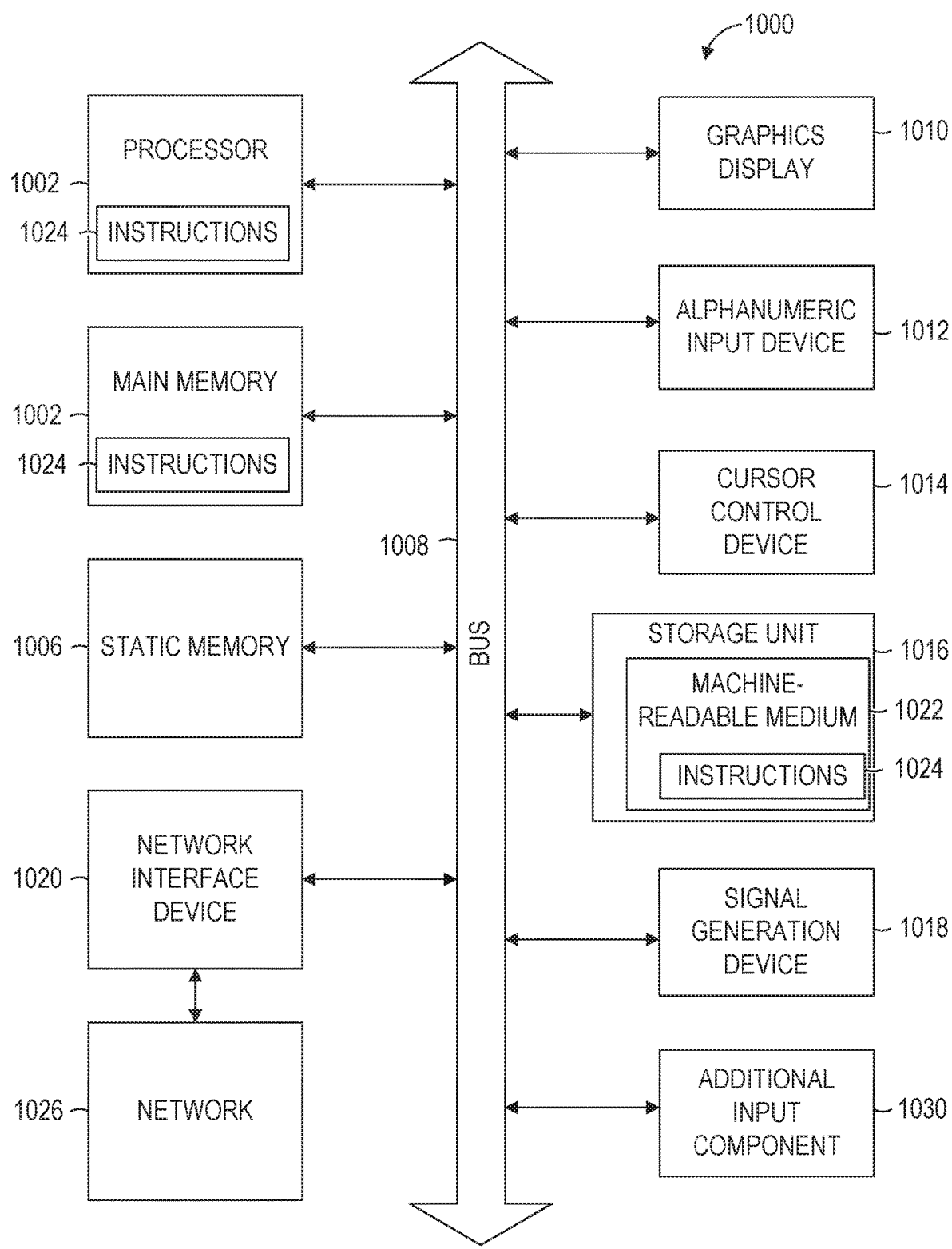
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instalment), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-readable media (e.g., tangible and non-transitory machine-readable media). The instructions 1024 may be transmitted or received over the network 1026 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing a plurality of items of digital content;
dynamically rendering, using one or more hardware processors, the plurality of items in a dedicated area of a user interface of a client device, the dynamic rendering including:
dynamically determining, for display in the dedicated area of the user interface, a first item group of one or more items of the plurality of items, the dynamic determining being based on dimensions of the one or more items in the first item group and dimensions of the dedicated area of the user interface,
causing display of the first item group of the plurality of items in the dedicated area of the user interface, and
dynamically determining a second item group of one or more items of the plurality of items, the one or more items included in the second item group being associated with a hidden style in a Document Object Model (DOM) based on dynamically determining that the dynamic rendering of the one or more items included in the second item group overflows the dedicated area;
dynamically rendering a call-to-action button in the dedicated area of the user interface based on the dynamic determining that the dynamic rendering of the one or more items included in the second item group overflows the dedicated area, the call-to-action button indicating a number of items included in the second item group;
receiving a selection of the call-to-action button via the user interface of the client device; and
in response to receiving the selection of the call-to-action button:
expanding the dedicated area within the user interface while maintaining the first item group in the dedicated area, the expanding resulting in an expanded dedicated area that is overlaid over additional content in the user interface without shifting the additional content; and
causing display of the one or more items included in the second item group in the expanded dedicated area;
wherein the expanded dedicated area is an overlay of specified dimensions and the overlay is rendered but hidden until the selection of the call-to-action button is received.

2. The method of claim 1, wherein the dedicated area of the user interface is an area of fixed dimensions, and wherein the plurality of items includes a plurality of identifiers of filters of content.

3. The method of claim 1, wherein
the one or more items included in the second item group are displayed following the one or more items included in the first item group displayed in the expanded dedicated area.

4. The method of claim 1, wherein the dynamic determining of the first item group includes:
rendering a second number of items of the plurality of items one-by-one in the dedicated area of the user interface until a particular item is identified as overflowing the dedicated area, the second number of items being included in the first item group of one or more items.

5. The method of claim 4, wherein the dynamic determining of the second item group includes:
assigning one or more remaining items of the plurality of items starting with the particular item identified as overflowing the dedicated area to the second item group.

6. The method of claim 1, wherein the one or more items included in the second item group are assigned to a stack, wherein the call-to-action button is dynamically rendered in the dedicated area based on a determination that the stack includes at least one item, and wherein the call-to-action button indicates a size of the stack.

7. The method of claim 1, further comprising, in response to receiving the selection of the call-to-action button, causing the one or more items in the second item group to be displayed in the user interface without issuing any calls over a network to a server to retrieve the one or more items in the second item group.

8. A system comprising:
one or more hardware processors; and
a non-transitory machine-readable medium for storing instructions that, when executed by the one or more hardware processors, cause the one or more hardware processors to perform operations comprising:
accessing a plurality of items of digital content;
dynamically rendering the plurality of items in a dedicated area of a user interface of a client device, the dynamic rendering including:
dynamically determining, for display in the dedicated area of the user interface, a first item group of one or more items of the plurality of items, the dynamic determining being based on dimensions of the one or more items in the first item group and dimensions of the dedicated area of the user interface,
causing display of the first item group of the plurality of items in the dedicated area of the user interface, and
dynamically determining a second item group of one or more items of the plurality of items, the one or more items included in the second item group being associated with a hidden style based on dynamically determining that the dynamic rendering of the one or more items included in the second item group overflows the dedicated area;
dynamically rendering a call-to-action button in the dedicated area of the user interface based on the dynamic determining that the dynamic rendering of the one or more items included in the second item group overflows the dedicated area, the call-to-action button including a number that represents a number of items included in the second item group;
receiving a selection of the call-to-action button via the user interface of the client device;

in response to receiving the selection of the call-to-action button via the user interface of the client device:
expanding the dedicated area within the user interface while maintaining the displayed first item group in the dedicated area, the expanding resulting in an expanded dedicated area that is overlaid over additional content in the user interface without shifting the additional content; and
causing display of the one or more items included in the second item group in the expanded dedicated area;
wherein the expanded dedicated area is an overlay of specified dimensions and the overlay is rendered but hidden until the selection of the call-to-action button is received.

9. The system of claim 8, wherein the dedicated area of the user interface is an area of fixed dimensions, and wherein the plurality of items includes a plurality of identifiers of filters of content.

10. The system of claim 8, wherein the one or more items included in the second item group are displayed following the one or more items included in the first item group displayed in the expanded dedicated area.

11. The system of claim 8, wherein the dynamic determining of the first item group includes:
rendering a second number of items of the plurality of items one-by-one in the dedicated area of the user interface until a particular item is identified as overflowing the dedicated area, the second number of items being included in the first item group of one or more items.

12. The system of claim 11, wherein the dynamic determining of the second item group includes:
assigning one or more remaining items of the plurality of items starting with the particular item identified as overflowing the dedicated area to the second item group.

13. The system of claim 8, wherein the one or more items included in the second item group are assigned to a stack, wherein the call-to-action button is dynamically rendered in the dedicated area based on a determination that the stack includes at least one item, and wherein the call-to-action button indicates a size of the stack.

14. A non-transitory machine-readable medium for storing instructions that, when executed by one or more hardware processors of a machine, cause the machine to perform operations comprising:
accessing a plurality of items of digital content;
dynamically rendering the plurality of items in a dedicated area of a user interface of a client device, the dynamic rendering including:
dynamically determining, for display in the dedicated area of the user interface, a first item group of one or more items of the plurality of items, the dynamic determining being based on dimensions of the one or more items in the first item group and dimensions of the dedicated area of the user interface,
causing display of the first item group of the plurality of items in the dedicated area of the user interface, and
dynamically determining a second item group of one or more items of the plurality of items, the one or more items included in the second item group being associated with a hidden style in a Document Object Model (DOM) based on dynamically determining that the dynamic rendering of the one or more items included in the second item group overflows the dedicated area; and
dynamically rendering a call-to-action button in the dedicated area of the user interface based on the dynamic determining that the dynamic rendering of the one or more items included in the second item group overflows the dedicated area;
receiving a selection of the call-to-action button via the user interface of the client device;
in response to receiving the selection of the call-to-action button via the user interface of the client device:
expanding the dedicated area within the user interface while maintaining the displayed first item group in the dedicated area, the expanding resulting in an expanded dedicated area that is overlaid over additional content in the user interface without shifting the additional content; and
causing display of the one or more items included in the second item group in the expanded dedicated area;
wherein the expanded dedicated area is an overlay of specified dimensions and the overlay is rendered but hidden until the selection of the call-to-action button is received.

15. The non-transitory machine-readable medium of claim 14, wherein the dedicated area of the user interface is an area of fixed dimensions, and wherein the plurality of items includes a plurality of identifiers of filters of content.

16. The non-transitory machine-readable medium of claim 14, wherein the one or more items included in the second item group are displayed following the one or more items included in the first item group displayed in the expanded dedicated area.

17. The non-transitory machine-readable medium of claim 14, wherein the dynamic determining of the first item group includes:
rendering a number of items of the plurality of items one-by-one in the dedicated area of the user interface until a particular item is identified as overflowing the dedicated area, the number of items being included in the first item group of one or more items.

18. The non-transitory machine-readable medium of claim 17, wherein the dynamic determining of the second item group includes:
assigning one or more remaining items of the plurality of items starting with the particular item identified as overflowing the dedicated area to the second item group.

* * * * *